US009667543B2

(12) United States Patent
Srinivas et al.

(10) Patent No.: US 9,667,543 B2
(45) Date of Patent: May 30, 2017

(54) ROUTING REQUESTS WITH VARIED PROTOCOLS TO THE SAME ENDPOINT WITHIN A CLUSTER

(71) Applicant: Microsoft Technology Licensing, LLC, Redmond, WA (US)

(72) Inventors: Nelamangala Krishnaswamy Srinivas, Sammamish, WA (US); Narayanan Annamalai, Redmond, WA (US); Parveen Kumar Patel, San Jose, CA (US); Marios Zikos, Alexandroupolis (GR); Narasimhan Agrahara Venkataramaiah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 14/455,427

(22) Filed: Aug. 8, 2014

(65) Prior Publication Data

US 2016/0043951 A1 Feb. 11, 2016

(51) Int. Cl.
*H04L 12/743* (2013.01)
*H04L 29/06* (2006.01)
(Continued)

(52) U.S. Cl.
CPC ........ *H04L 45/7453* (2013.01); *H04L 47/125* (2013.01); *H04L 67/1027* (2013.01);
(Continued)

(58) Field of Classification Search
CPC ..... H04L 67/1027; H04L 45/74; H04L 69/16; H04L 45/7453; H04L 47/125; H04L 69/165; H04L 69/18; H04L 45/24
See application file for complete search history.

(56) References Cited

U.S. PATENT DOCUMENTS 6,424,992 B2 7/2002 Devarakonda et al.
6,587,866 B1 7/2003 Modi et al.
(Continued)

OTHER PUBLICATIONS

"International Search Report and Written Opinion Issued in PCT Application No. PCT/US2015/043897", Mailed Date: Oct. 1, 2015, 11 Pages.

(Continued)

*Primary Examiner* — Gbemileke J Onamuti
(74) *Attorney, Agent, or Firm* — Workman Nydegger

(57) ABSTRACT

Embodiments are directed to routing requests with different protocols to the same destination. In one scenario, a computer system receives a request that uses a specified protocol. The request includes a request source identifier and a request destination identifier. The computer system identifies, based on both the request source identifier and the request destination identifier, a destination to send the request to and generates a routing entry for the request that indicates which destination the first request was sent to. The computer system receives another request that uses a different protocol. This request includes a request source identifier and a request destination identifier of its own. The computer system determines that the request source identifier and request destination identifier of the subsequent request match those of the generated routing entry, and routes the subsequent request to the destination indicated in the routing entry.

20 Claims, 5 Drawing Sheets

(51) Int. Cl.
*H04L 12/803* (2013.01)
*H04L 29/08* (2006.01)
*H04L 12/707* (2013.01)

(52) U.S. Cl.
CPC ............ *H04L 69/16* (2013.01); *H04L 69/165* (2013.01); *H04L 45/24* (2013.01); *H04L 69/18* (2013.01)

(56) References Cited

U.S. PATENT DOCUMENTS 6,748,437 B1 6/2004 Mankude et al.
6,870,849 B1 3/2005 Callon et al.
7,003,574 B1 2/2006 Bahl
7,088,718 B1 8/2006 Srivastava
7,346,686 B2 3/2008 Albert et al.
7,353,276 B2 4/2008 Bain et al.
7,472,205 B2 * 12/2008 Abe ........................ H04L 29/06 710/22
7,536,693 B1 5/2009 Manczak et al.
7,609,916 B2 10/2009 Santori et al.
7,694,009 B2 4/2010 Shah et al.
7,877,511 B1 1/2011 Berger et al.
8,095,935 B2 1/2012 Paramasivam et al.
2002/0143953 A1 10/2002 Aiken, Jr.
2003/0023744 A1 1/2003 Sadot
2003/0088672 A1 5/2003 Togasaki
2003/0172164 A1 9/2003 Coughlin
2003/0225859 A1 12/2003 Radia et al.
2004/0205250 A1 10/2004 Bain et al.
2004/0260745 A1 12/2004 Gage et al.
2004/0268357 A1 12/2004 Joy et al.
2005/0038905 A1 2/2005 Banes et al.
2006/0036747 A1 2/2006 Galvin
2006/0155862 A1 7/2006 Kathi et al.
2006/0165003 A1 7/2006 Partridge
2006/0248194 A1 11/2006 Ly et al.
2007/0005801 A1 1/2007 Kumar et al.
2007/0209040 A1 9/2007 Alstad
2008/0025230 A1 1/2008 Patel et al.
2008/0195754 A1 8/2008 Cuomo et al.
2008/0228926 A1 9/2008 Shiratzky et al.
2008/0275943 A1 11/2008 Grayson et al.
2009/0265467 A1 10/2009 Peles
2009/0271798 A1 10/2009 Iyengar et al.
2010/0322076 A1 12/2010 Goel
2012/0163180 A1 6/2012 Goel
2012/0271964 A1 * 10/2012 Porter ................. H04L 67/1008 709/235

OTHER PUBLICATIONS

Carpenter, et al., “Using the IPv6 Flow Label for Load Balancing in Server Farms”, In Proceedings of Request for Comments: 7098, Jan. 2014, 14 pages.
“Introducing a Purpose-Built 24 port 10G Load Balancer”, Retrieved on: Jun. 19, 2014 Available at: http://www.ptcnetworking.net/products/pdfs/no_pdfs/PUBXBALD-v4.pdf.
Carpenter, et al., “Using the IPv6 Flow Label for Equal Cost Multipath Routing and Link Aggregation in Tunnels”, In Proceedings of Request for Comments: 6438, Nov. 2011, 10 pages.
“Second Written Opinion Issued in PCT Application No. PCT/US2015/043897”, Mailed Date: Jun. 16, 2016, 8 Pages.
“A Proposal of DNS-Based Adaptive Load Balancing Method for Mirror Server Systems and Its Implementation,” by Hiroshi Yokota, Shigetomo Kimura and Yoshihiko Ebihara, University of Tsukuba, IEEE 2004, 18th International Conference on Advanced Information Networking and Application, 6 pgs. [online] [retrieved on Apr. 11, 2008]. Retrieved from the Internet: http://ieeexplore.ieee.org/Xplore/login.jsp?url=/iel5/9028/28653/01283788.pdf?arnumber=1283788.
“How Network Load Balancing Technology Works,” by Author Unknown, Microsoft Corporation, Mar. 28, 2003, 19 pgs. [online] [retrieved on Apr. 11, 2008]. Retrieved from the Internet: http://technet2.microsoft.com/WindowsServer/en/library/1611cae3-5865-4897-a186-7e6ebd8855cb1033.mspx?mfr=true.
U.S. Appl. No. 12/147,155, Aug. 2, 2011, Office Action.
U.S. Appl. No. 12/147,155, Sep. 22, 2011, Notice of Allowance.
“International Preliminary Report on Patentability Issued in PCT Application No. PCT/US2015/043897”, Mailed Date: Oct. 24, 2016, 9 Pages.

* cited by examiner

ROUTING REQUESTS WITH VARIED PROTOCOLS TO THE SAME ENDPOINT WITHIN A CLUSTER

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems may be networked together to provide scalable computing resources. Such resources are often referred to as cloud resources, or simply the cloud. The cloud may provide services such as load balancing, which distributes processing load over a plurality of different physical computing systems. In some cases, load balancers (whether software- or hardware-based) may send similar requests received over different protocols to different locations.

BRIEF SUMMARY

Embodiments described herein are directed to routing requests with different protocols to the same destination. In one embodiment, a computer system receives a request that uses a specified protocol. The request includes a request source identifier and a request destination identifier. The computer system identifies, based on both the request source identifier and the request destination identifier, a destination to send the request to and generates a routing entry for the request that indicates which destination the first request was sent to. The computer system receives another request that uses a different protocol. This request includes a request source identifier and a request destination identifier of its own. The computer system determines that the request source identifier and request destination identifier of the subsequent request match those of the generated routing entry, and routes the subsequent request to the destination indicated in the routing entry.

In another embodiment, a computer system receives a request that uses a specified protocol. As above, the request includes a request source identifier and a request destination identifier. The computer system then hashes the request source identifier and the request destination identifier of the request. The resulting first hash value identifies a destination to send the request to. The computer system stores the first hash value for the request which identifies the destination the first request was sent to. The computer system then receives another request that uses a different protocol. This request includes a request source identifier and a request destination identifier which are hashed to create a different hash value. The computer system determines whether the two hash values match and, if so, routes the subsequent request to the destination indicated by the first hash value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
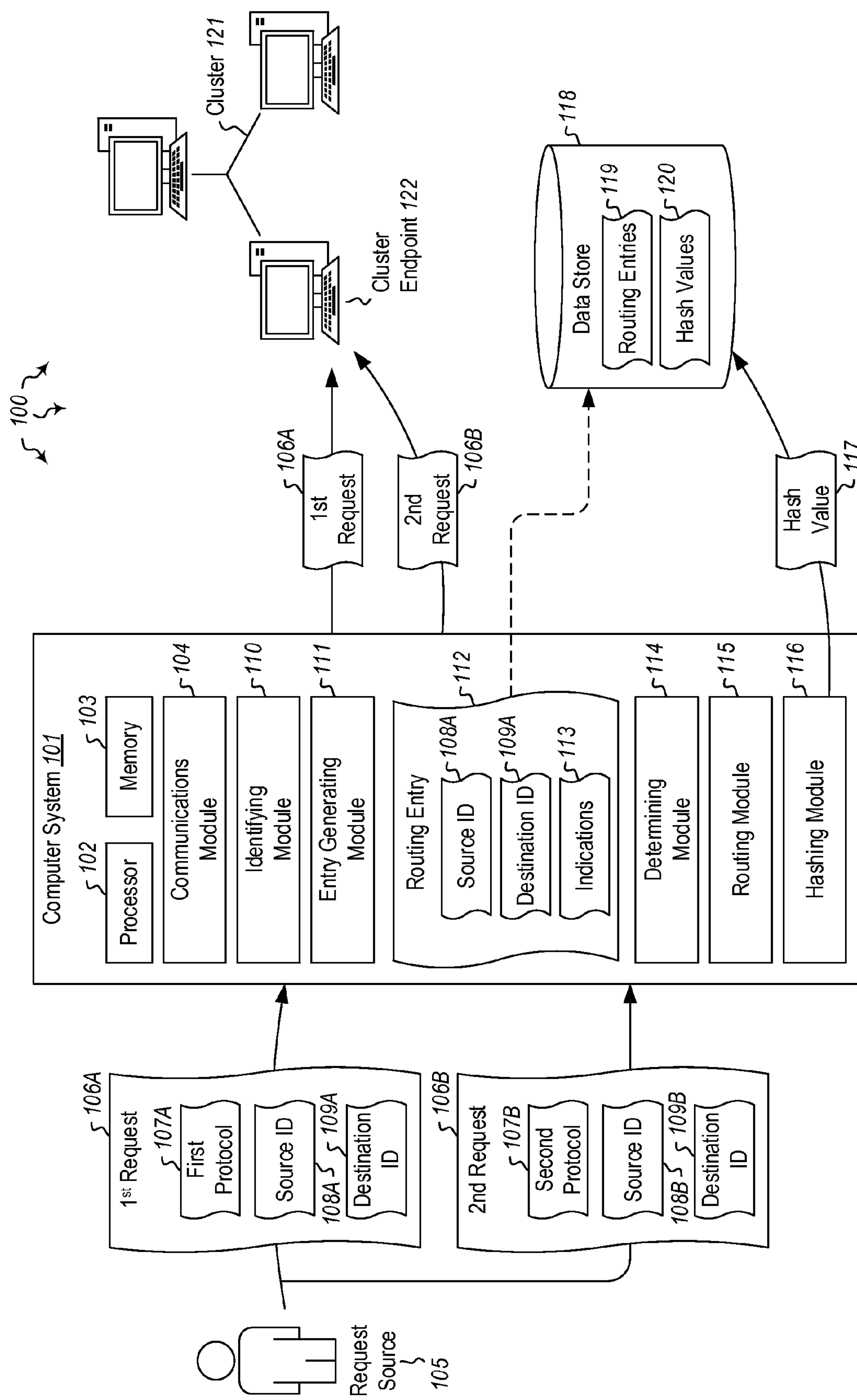
FIG. 1 illustrates a computer architecture in which embodiments described herein may operate including routing requests with different protocols to the same destination.

Embodiments described herein are directed to routing requests with different protocols to the same destination. In one embodiment, a computer system receives a request that uses a specified protocol. The request includes a request source identifier and a request destination identifier. The computer system identifies, based on both the request source identifier and the request destination identifier, a destination to send the request to and generates a routing entry for the request that indicates which destination the first request was sent to. The computer system receives another request that uses a different protocol. This request includes a request source identifier and a request destination identifier of its own. The computer system determines that the request source identifier and request destination identifier of the subsequent request match those of the generated routing entry, and routes the subsequent request to the destination indicated in the routing entry.

In another embodiment, a computer system receives a request that uses a specified protocol. As above, the request includes a request source identifier and a request destination identifier. The computer system then hashes the request source identifier and the request destination identifier of the request. The resulting first hash value identifies a destination to send the request to. The computer system stores the first hash value for the request which identifies the destination the first request was sent to. The computer system then receives another request that uses a different protocol. This request includes a request source identifier and a request destination identifier which are hashed to create a different hash value. The computer system determines whether the two hash values match and, if so, routes the subsequent request to the destination indicated by the first hash value.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The computing module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 may include other modules including the identifying module 110. The identifying module 110 may be configured to identify various information regarding requests sent from users or from other computing systems. For example, first request 106A may be sent from user 105 or from another computing system. The first request 106A may include different portions of information including an indication of which protocol is being used to send the request. The first protocol 107A may be any type of protocol including a file transfer protocol (FTP), internet protocol (IP), transmission control protocol (TCP), user datagram protocol (UDP) or other type of protocol. The first request 106A may further include a source identifier (ID) 108A that identifies the source of the request (i.e. it identifies the user or computing system that sent the first request). The first request may still further include a destination identifier 109A that identifies the destination of the request. Thus, for example, the source identifier may identify the user's mobile or other computing system, and the destination may identify a cluster endpoint (e.g. 122) or may identify a specific computing system, or may identify a virtual machine. The identifying module may thus analyze the information in the first request 106A (and in subsequent requests such as 106B) and determine how the first request is to be handled.

In some cases, the request 106A may request the uploading or downloading of data. For instance, cloud service providers may implement processing hardware configurations such as cluster 121 that provides services. Some of these services may include media upload services which enable media content to be uploaded efficiently to the cloud via a wide area network (WAN), via a cellular network or via some other network. Some network connections are not able to provide guarantees for jitter and losses. As such, media upload services are subjected to the behavior of TCP's high-bandwidth response to loss and delays. In some cases, the UDP protocol may be used by media upload services in conjunction with TCP. TCP will be used to negotiate service level, authentication, etc. and UDP will transfer the data packets.

Hence, media upload services (and other types of services) may implement two parallel connections to the media upload service (e.g. UDP and TCP), originating from the same client. Media upload services often use comparatively large amounts of bandwidth. In order to prevent these large data uploads from being flagged as potential distributed denial of service (DDoS) attacks, load balancers or other hardware or software functionality may be implemented to identify the data uploads as legitimate uploads and not mark them as potential network attacks. In cases where software load balancers are used to analyzed and distribute incoming requests (e.g. 106A/106B), a separate software load balancer may be instantiated for each cluster that is capable of hosting high bandwidth media or other types of services.

At least in some cases, a destination computing node, cluster endpoint (e.g. 122), virtual machine or other request destination may be arrived at by hashing on five tuples: request source address, request source port, destination address, destination port and the protocol being used. In such cases, however, when requests that are intended for the same endpoint but use different protocols are hashed, the hashes are different, leading the requests to different cluster endpoints. Alternatively, embodiments may hash using two tuples: source address and destination address, or four tuples: source address, source port, destination address and destination port (it should be noted that in the case of four tuples, if the client closes and re-opens the connection or starts a new session from the same source IP, the source port will change and cause the network traffic to go to a different cluster endpoint). In such cases, as the source address, source port, destination address and destination port will remain the same for upload or download requests, the hash will be the same, regardless of which protocol is being used. Thus, the target endpoint (e.g. cluster endpoint 122) will be reached even if the same client is using different protocols to send data requests.

Continuing with FIG. 1, the computing system 101 may further include entry generating module 111. The entry generating module 111 may create routing entries and store them locally or in a data store (e.g. 118). The generated routing entry 112 may include various pieces of information including a source ID (108A or 108B), a destination ID (109A or 109B) and/or an indication of which destination the request was sent to. The routing entry may be accessed by the determining module 114 which may determine which cluster endpoint (e.g. 122) the request is to be sent to. Once the appropriate cluster endpoint has been determined, the routing module 115 may route the received request 106A to that cluster endpoint. When a second request (e.g. 106B) is received using a different protocol (e.g. TCP or UDP), the determining module 114 may look at the destination ID 109B in the request directly, or may access a generated routing entry 112. The determining module 114 may determine which cluster endpoint the request is to be sent to, and the routing module 115 may route the request to the determined endpoint. These concepts will be explained further below with regard to methods 200 and 300 of FIGS. 2 and 3, respectively.

Figure 2:
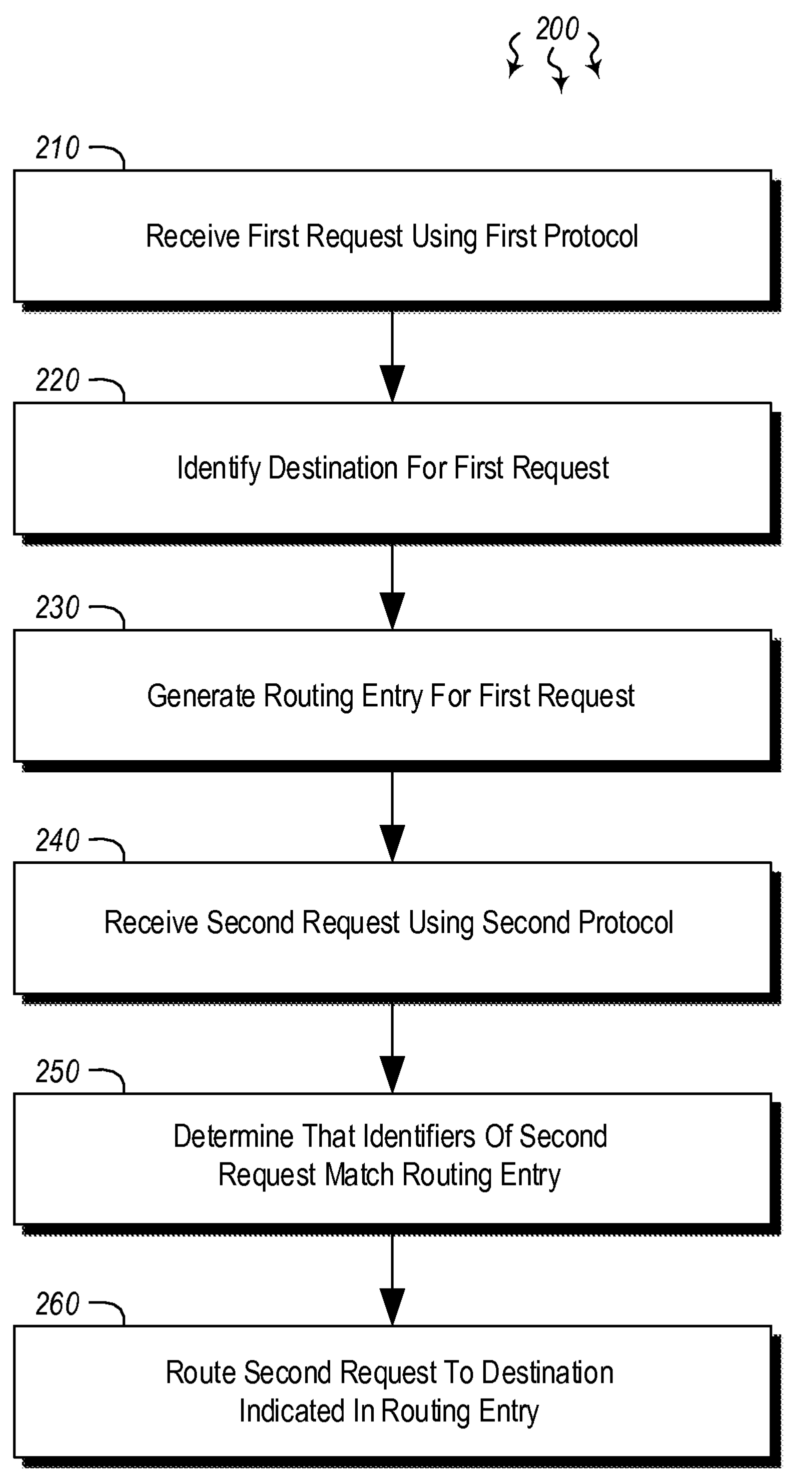
FIG. 2 illustrates a flowchart of an example method for routing requests with different protocols to the same destination.
Figure 3:
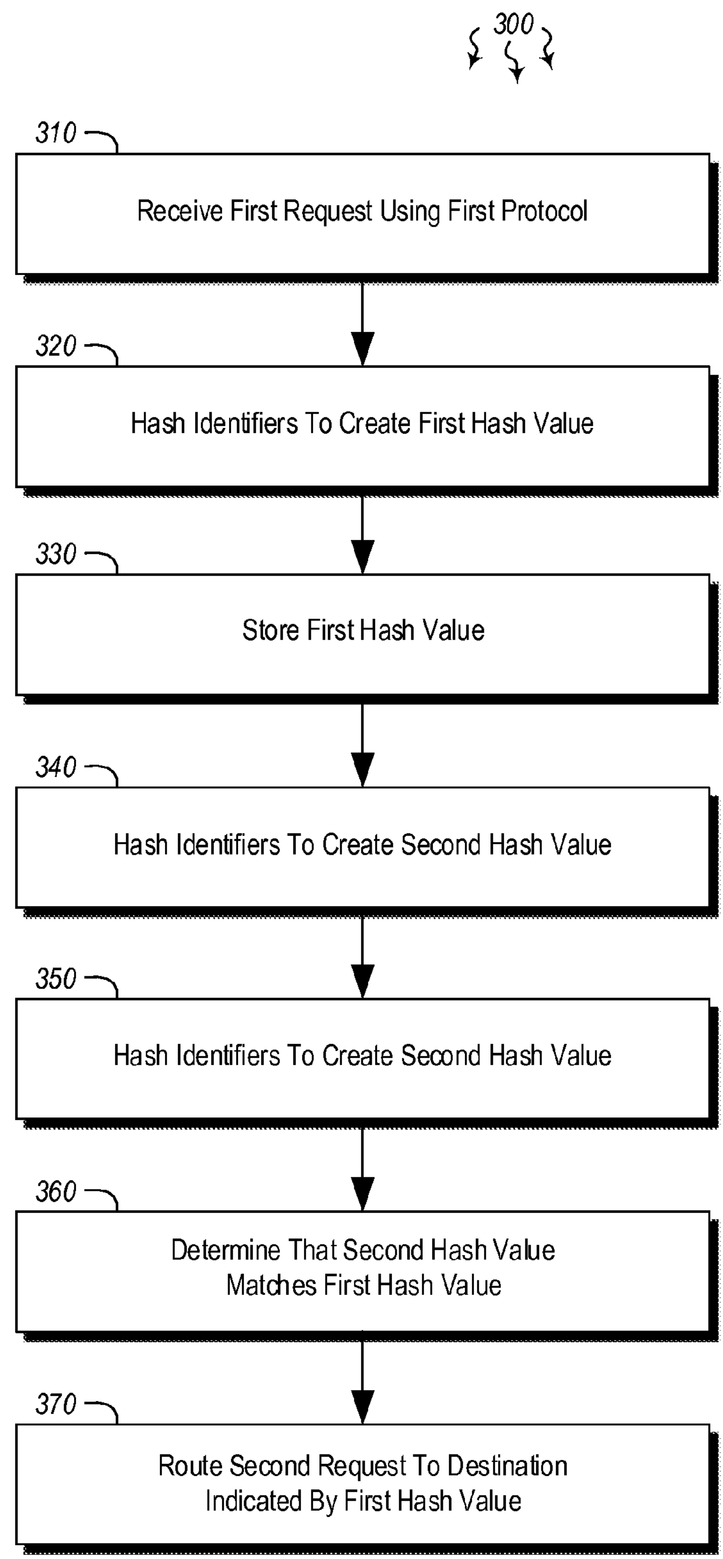
FIG. 3 illustrates a flowchart of an alternative example method for routing requests with different protocols to the same destination.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for receiving a first request that uses a first protocol, the first request including a request source identifier and a request destination identifier. The method 200 will now be described with frequent reference to the components and data of environment 100.

Method 200 includes an act of receiving a first request that uses a first protocol, the first request including a request source identifier and a request destination identifier (act 210). For example, communications module 104 of computer system 101 may receive first request 106A from request source 105. The request source may be a user (e.g. 105) or a computing system of some type. The request 106A may be a request to upload data to a cloud database or service, or to download data from a database or service, or to otherwise access data. The request may be issued by an application or directly by the user. For example, the request 106A may be issued by an application that is used to upload data. In one embodiment, a user may open an application that uploads media such as movies, songs, videos, games, documents or other data to a cloud service. The cloud service may have access to cloud processing and storage resources, including access to data store 118. Many different types of applications may be used on the requesting end, and similarly, many different types of cloud services may be used on the receiving end. As such, embodiments described herein are not limited to uploading or downloading media items.

The cluster 122 may include substantially any number of computing systems, including any number of discreet hardware processors or hardware processing cores, and may further have substantially any amount of short term or long term storage. The cluster may be scalable, and may be configured to dynamically reassign processing and/or storage resources as needed by requesting applications. In some cases, the cluster 121 may be configured to run virtual machines. These virtual machines may be run on a single blade or computing system, or may expand multiple blades and even multiple racks of blades. Multiple virtual machines may also be run on a single blade or computing system. Thus, when the terms "endpoint" or "cluster endpoint" are used herein, they may refer to a physical computing system or to a virtual machine. Moreover, as a service may run on many different physical computing systems, an endpoint may also refer to a service that is designed to receive a request (e.g. 106A).

Method 200 further includes an act of identifying, based on both the request source identifier and the request destination identifier, a destination to send the first request to (act 220). The identifying module 110 of computer system 101 may thus identify a destination for the first request 106A based on the request source identifier 108A and the destination ID 109A. As the identifying module looks to both the source ID and the destination ID to determine where the request should be routed, certain request sources (e.g. user 105) may be tied to certain endpoints, and the system can ensure that the user is repeatedly and reliably connected to the same endpoint on the cluster 121. The identifying module can identify the same cluster endpoint (regardless of how many cluster nodes are currently running a given service) for requests received using many different protocols. Regardless of which protocol is used for the request, the appropriate destination endpoint will be determined.

Method 200 also includes an act of generating a routing entry for the first request, the routing entry indicating which destination the first request was sent to (act 230). The routing entry may include the source ID 108A received in the first request 106A, the destination ID 109A of the request and an indication of where the request was ultimately routed to. The routing entry may be sent to the data store 118 along with a plurality of other routing entries 119 that are also stored there. In this manner, the data store may maintain a running log of routing entries which specify where each routing request was routed to, who it was received from and which destination was indicated on the request.

Method 200 includes an act of receiving a second request that uses a second, different protocol, the second request including a request source identifier and a request destination identifier (act 240). For example, the communications module 104 of computer system 101 may receive second request 106B from the request source 105 which may be a user or other computer system. The second request 106B, like the first request 106A, includes an indication of which protocol 107B is being used, a source ID 108B and a destination ID 109B. The determining module 114 may determine that the request source identifier and request destination identifier of the second request match those of the generated routing entry (act 250), and route the second request 106B to the destination indicated in the routing entry (act 260).

Figure 5:
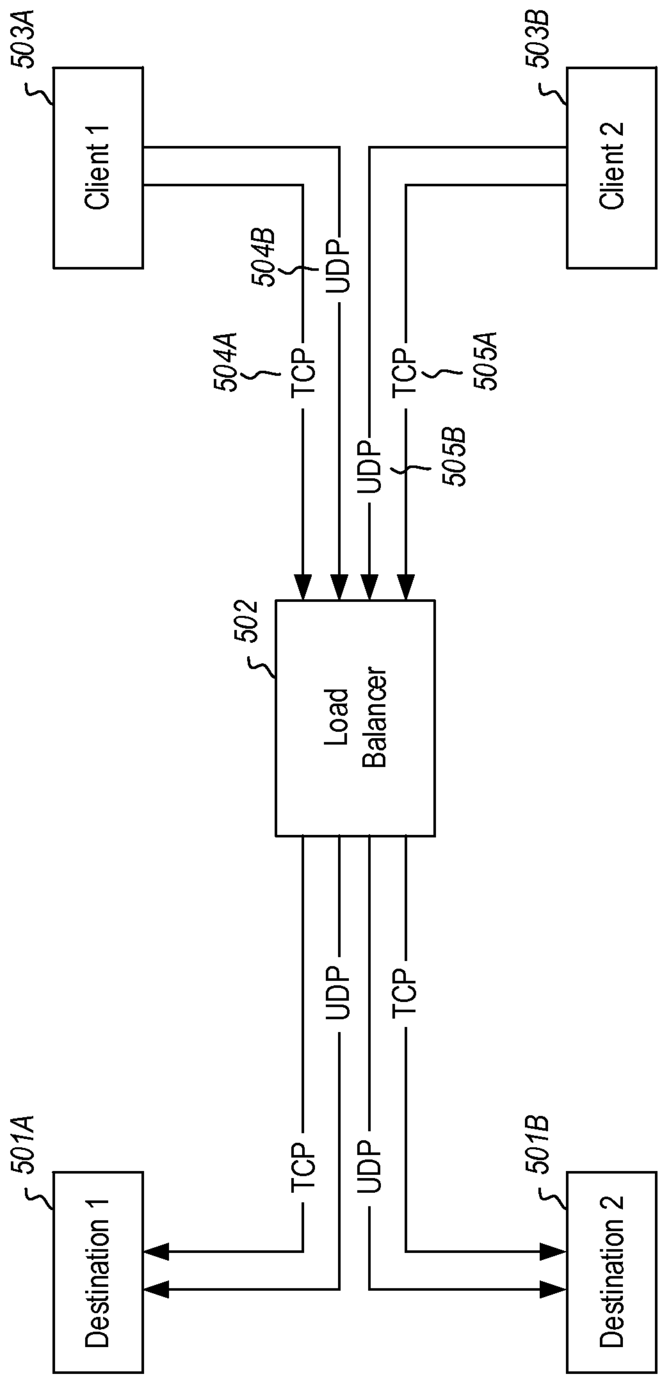
FIG. 5 illustrates an embodiment where various clients send requests using different protocols and those requests are routed to the appropriate endpoints.

In some embodiments, the computer system 101 may be a load balancer. For instance, the computer system 101 may be a hardware load balancer that receives requests and routes them to appropriate destinations (e.g. cluster endpoints). Alternatively, the computer system 101 may instantiate a software load balancer that performs the functions of receiving requests, identifying the destination based on source ID and destination ID and routing the request to the determined cluster endpoint. Accordingly, as shown in FIG. 5, a first client 503A may send a first request 504A that is a TCP request, and then send a second request 504B that is a UDP request. Because the load balancer 502 determines the destination based on both the request source ID and the destination ID, the load balancer will route Client 1's request to destination 1 (501A). Similarly, Client 2 (503B) may send a TCP request 505A and a UDP request 505B to the load balancer 502. The load balancer may then determine that the requests are both tied to Client 2 (503B) and may route both requests to the same destination 2 (501B). As such, a user may be able to establish a session with a specific cluster endpoint, and continually have their requests routed to that cluster endpoint.

In some embodiments, the hashing module 116 of computer system 101 may hash the request source identifier (e.g. 108A) and the request destination identifier (e.g. 109A). The hash may thus incorporate both the source and the destination identifiers, and may be a unique value that represents the determined destination. Then, whenever future requests are received that include the same source and destination identifiers, the hashing module 116 will generate the same hash value for the subsequent requests, and they will be routed to the same destination endpoint in the cluster 121. In this manner, the destination to send a received request to is identified based on the hash value resulting from hashing the request source identifier and the request destination identifier.

Similarly, in another embodiment, the identifying module 110 may be configured to look up or otherwise identify an equivalence class identifier for the protocols that are used to send requests. The equivalence class identifier may be used in cases where multiple protocols (or all protocols used in a given implementation) are part of one equivalence class. In such cases, the hashing module 116 may generate a hash value 117 for those protocols that are part of the equivalence class by hashing the request source identifier, the request destination identifier and a protocol equivalent class identifier that identifies the protocol equivalence class.

Figure 4:
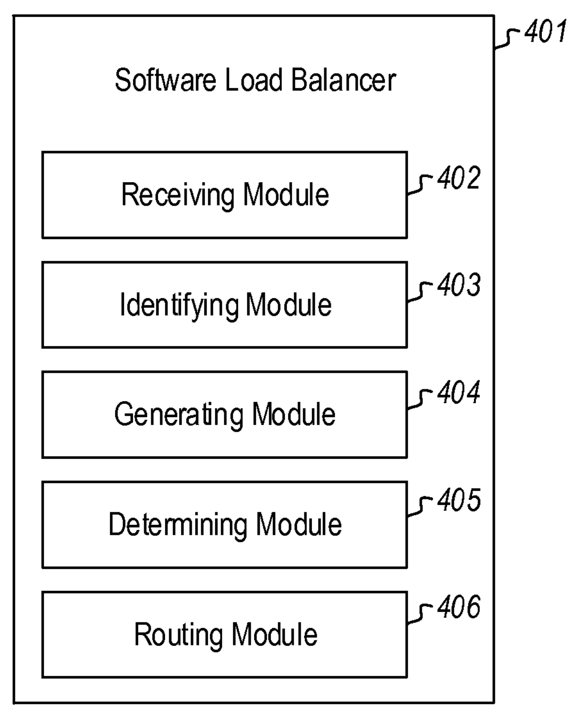
FIG. 4 illustrates an embodiment of a software load balancer that includes modules for routing requests with different protocols to the same destination.

As shown in FIG. 4, a load balancer (whether hardware or software based) may include software or hardware functionality modules that allow the load balancer to perform the method for routing requests with different protocols to the same destination. Indeed, the load balancer 401 may include a receiving module 402 for receiving requests from users and other computing systems. The load balancer 401 may also include an identifying module 403 that identifies which endpoint the request is to be sent to by hashing the source ID and destination ID, and assigning the resulting hash value to a specified cluster endpoint. The generating module 404 of the load balancer 401 may generate a routing entry 112 that indicates the source and destination IDs for the request, as well as an indication of where the request was ultimately sent. The determining module 405 makes a determination, for instance based on the hash, of which endpoint to send the request to and the routing module 406 sends the request to that destination. In this manner, the load balancer 401 of FIG. 4 may be used send requests using different protocols to the same cluster endpoint.

As mentioned above, media applications that allow users to upload or download data may use large amounts of bandwidth. In such cases, software or hardware load balancers may be instantiated in larger numbers, so that separate load balancers are instantiated for clusters that are configured to host high-bandwidth services. Each of these load balancers may be configured to communicate with each other, and may be configured to determine endpoint destinations in the same manner, so that regardless of which load balancer handles a given request, that request will be routed to the same destination endpoint. In some cases, the services hosted by cluster 121 that implement load balancing may be services that use at least a specified threshold amount of bandwidth. The threshold may be set to any amount of bandwidth and may change depending on the availability of cloud processing resources.

The cluster 121 is designed to allow for some amount of component failure. For instance, a cluster node (e.g. 122) may fail or become unavailable for a variety of reasons. If a given destination endpoint has become unavailable to receive and/or process requests, the cluster may fail over to a different destination endpoint. The new destination endpoint may be associated with the users/request sources that were associated with the previously functioning endpoint, and the new associations may be stored in routing entries. Thus, subsequent incoming requests will still be routed to the same (failed over) endpoint. Once the user is connected to the service and is transferring and receiving data packets, the user may upload data to the destination indicated in the (updated) routing entry. The user's connection may implement multiple different simultaneous connections, where each connection uses a different protocol.

In one embodiment, the first and second requests (106A and 106B) of FIG. 1 may each be data upload requests. Once a destination endpoint has been determined for the requests, user- or source-based affinity will cause the same destination to be used each time the user attempts to upload data. In some cases, a small portion of data may be added to a field in a data packet for the first protocol indicating the destination endpoint. Then, subsequent data packets may be affinitized to the destination specified in the data packet field (this may be an option field in a UDP packet, for example.

Turning now to FIG. 3, a flowchart is illustrated of a method 300 for receiving a first request that uses a first protocol, the first request including a request source identifier and a request destination identifier. The method 300 will now be described with frequent reference to the components and data of environment 100.

Method 300 includes an act of receiving a first request that uses a first protocol, the first request including a request source identifier and a request destination identifier (act 310). For example, communications module 104 of computer system 101 may receive first request 106A from request source 105. The first request includes an indication of the protocol 107A being used, as well as a source ID 108A and a destination ID 109A. The hashing module 116 hashes the request source identifier and the request destination identifier of the first request such that the resulting first hash value 117 identifies a destination to send the first request to (act 320). The first hash value 117 is stored in data store 118 (potentially with other hash values 120), where the first hash value identifies the destination the first request was sent to (act 330).

Method 300 further includes an act of receiving a second request that uses a second, different protocol, the second request including a request source identifier and a request destination identifier (act 340). The second request 106B, like the first request, includes an indication of which protocol 107B is being used for the request, along with a source ID 108B and a destination ID 109B. Once received at the computing system 101, the hashing module 116 may hash the request source identifier and the request destination identifier of the second request to create a second hash value (act 350). The hash value 117 may be stored in data store 118 along with other hash values 120, and at least in some cases, may be part of a routing entry 112. In some cases, the hash values may be stored in and accessed from flow tables that are part of data store 118. The determining module 114 of computer system 101 may then determine that the second hash value matches the first hash value (act 360) and the routing module 115 may route the second request to the destination indicated by the first hash value (act 370).

As described herein, the method for routing requests with different protocols to the same destination is transport-protocol agnostic. Accordingly, the requests may use substantially any type of protocol to transmit the requests. By identifying a source and destination ID for each request, and by using those values to determine the ultimate endpoint, each subsequent request packet can be reliably forwarded to the same endpoint. The protocols may thus be TCP and UDP in some cases, and TCP and FTP or another protocol in other cases. It should also be noted that hash values may be generated based on other values in addition to (or as an alternative to) the request source identifier and the request destination identifier of the request. Accordingly, in one example, the hash value 117 may be generated by hashing the request source identifier, the request destination identifier, and at least one hardware identifier such as a piece of hardware such as a media access control (MAC) address that is part of computer system 101.

Accordingly, methods, systems and computer program products are provided which route requests with different protocols to the same endpoint destination.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for routing requests with different protocols to a same destination, the method comprising:

an act of receiving a first request that uses a first protocol, wherein the first request includes a first request source identifier and a first request destination identifier, and wherein the first protocol is included within a common class of protocols that each shares a same class identifier such that the first protocol has associated therewith the same class identifier;

an act of identifying, based on both the first request source identifier and the first request destination identifier, a destination to send the first request to;

an act of generating a routing entry for the first request, the routing entry including 1) the first request source identifier, 2) the first request destination identifier, and 3) an indication of the destination;

an act of receiving a second request that uses a second, different protocol, wherein the second request includes a second request source identifier and a second request destination identifier, and wherein the second protocol is also included within the common class of protocols such that the second protocol shares the same class identifier as the first protocol;

an act of determining that the second request source identifier and the second request destination identifier of the second request match those of the generated routing entry; and an act of routing the second request to the destination indicated in the routing entry.

2. The method of claim 1, further comprising an act of hashing the first request source identifier and the first request destination identifier.

3. The method of claim 2, wherein the destination to send the first request to is identified based on a hash value resulting from hashing the first request source identifier and the first request destination identifier.

4. The method of claim 1, further comprising:

an act of computing a hash value using 1) the same class identifier, 2) the first request source identifier, and 3) the first request destination identifier.

5. The method of claim 1, wherein a load balancer performs the method for routing requests with different protocols to the same destination.

6. The method of claim 5, wherein the load balancer comprises a software load balancer, and wherein a separate software load balancer is instantiated for clusters that are configured to host specified services.

7. The method of claim 6, wherein the specified hosted services comprise services that use at least a specified threshold amount of bandwidth.

8. The method of claim 1, further comprising:

an act of determining that the destination is no longer available to receive requests; and an act of failing over to a second, different destination.

9. The method of claim 1, further comprising an act of uploading one or more portions of data to the destination indicated in the routing entry.

10. The method of claim 1, wherein the first and second requests comprise data upload requests, and wherein user-based affinity causes the same destination to be used each time the user attempts to upload data.

11. The method of claim 10, further comprising:

an act of adding a portion of data to a field in at least one data packet for the first protocol; and an act of affinitizing one or more subsequent data packets to the destination specified in the data packet field.

12. At a computer system including at least one processor, a computer-implemented method for routing requests with different protocols to a same destination, the method comprising:

an act of receiving a first request that uses a first protocol, wherein the first request includes a first request source identifier and a first request destination identifier, and wherein the first protocol is included within a common class of protocols that each shares a same class identifier such that the first protocol has associated therewith the same class identifier;

an act of hashing 1) the same class identifier of the first protocol, 2) the first request source identifier, and 3) the first request destination identifier, wherein a resulting first hash value identifies a destination to send the first request to;

an act of storing the first hash value for the first request, wherein the first hash value identifies the destination;

an act of receiving a second request that uses a second, different protocol, wherein the second request includes a second request source identifier and a second request destination identifier, and wherein the second protocol is also included within the common class of protocols such that the second protocol shares the same class identifier as the first protocol;

an act of hashing 1) the same class identifier of the second protocol, 2) the second request source identifier, and 3) the second request destination identifier to create a second hash value;

an act of determining that the second hash value matches the first hash value; and an act of routing the second request to the destination indicated by the first hash value.

13. The method of claim 12, wherein the method for routing requests with different protocols to the same destination is transport-protocol agnostic.

14. The method of claim 12, wherein the first hash value is stored in and accessed from a flow table.

15. The method of claim 12, wherein the first protocol is either a transmission control protocol (TCP) or a user datagram protocol (UDP).

16. The method of claim 12, wherein the first hash value is also based on at least one hardware identifier.

17. The method of claim 16, wherein the at least one hardware identifier comprises a media access control (MAC) address for a sender of the first request.

18. A computer program product comprising one or more computer-readable hardware storage media having stored thereon computer-executable instructions that are executable by one or more processors of a computing system; to cause the computing system to instantiate the following:

a load balancing module configured to:

receive a first request that uses a first protocol, wherein the first request includes a first request source identifier and a first request destination identifier, and wherein the first protocol is included within a common class of protocols that each shares a same class identifier such that the first protocol has associated therewith the same class identifier;

identify, based on both the first request source identifier and the first request destination identifier, a destination to send the request to;

generate a routing entry for the first request, wherein the routing entry indicates the destination;

receive a second request that uses a second, different protocol, wherein the second request includes a second request source identifier and a second request destination identifier, and wherein the second protocol is also included within the common class of protocols such that the second protocol shares the same class identifier as the first protocol;

determine that the second request source identifier and the second request destination identifier of the second request match those of the generated routing entry; and route the second request to the destination indicated in the routing entry.

19. The computer program product of claim 18, wherein the load balancing module comprises a software load balancer, and wherein a separate software load balancer is instantiated for clusters that are configured to host specified services.

20. The computer program product of claim 18, wherein the first and second requests comprise data upload requests, and wherein user-based affinity causes the destination to be used each time a user attempts to upload data.

* * * * *